US011416192B2

(12) United States Patent
Yanagisawa

(10) Patent No.: US 11,416,192 B2
(45) Date of Patent: Aug. 16, 2022

(54) ELECTRONIC APPARATUS AND WIRELESS COMMUNICATION METHOD TO CONNECT THE ELECTRONIC APPARATUS AND TERMINAL DEVICE TO SAME ACCESS POINT

(71) Applicant: SEIKO EPSON CORPORATION, Tokyo (JP)

(72) Inventor: Kazuki Yanagisawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/215,633

(22) Filed: Mar. 29, 2021

(65) Prior Publication Data
US 2021/0303240 A1 Sep. 30, 2021

(30) Foreign Application Priority Data
Mar. 30, 2020 (JP) .............................. JP2020-059822

(51) Int. Cl.
*G06F 3/12* (2006.01)
*H04W 76/11* (2018.01)
*H04W 48/20* (2009.01)
*H04W 48/16* (2009.01)

(52) U.S. Cl.
CPC ............ *G06F 3/1236* (2013.01); *G06F 3/123* (2013.01); *G06F 3/1207* (2013.01); *G06F 3/1286* (2013.01); *H04W 48/16* (2013.01); *H04W 48/20* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 9,826,475 B1* | 11/2017 | Mitsuhashi | H04W 48/14 |
| 2013/0260682 A1* | 10/2013 | Suzuki | H04W 76/14 |
| | | | 455/41.1 |
| 2014/0293331 A1* | 10/2014 | Asai | G06F 3/1204 |
| | | | 358/1.15 |
| 2014/0362841 A1* | 12/2014 | Shibata | H04W 48/18 |
| | | | 370/338 |

(Continued)

FOREIGN PATENT DOCUMENTS

JP 2018019285 A 2/2018

*Primary Examiner* — Henok Shiferaw
(74) *Attorney, Agent, or Firm* — Chip Law Group

(57) ABSTRACT

An electronic apparatus includes a wireless communication section configured to perform wireless communication, a storing section configured to store identification information of a terminal device to which the wireless communication section has an achievement of connection through a network, and a processing section configured to perform communication control for the wireless communication section. The processing section performs searching processing for external access points, performs second searching processing for searching for the terminal device corresponding to the identification information stored in the storing section in a network formed by the external access points found by the searching processing, and causes the wireless communication section to connect to the external access point to which the terminal device found by the second searching processing is connected.

10 Claims, 10 Drawing Sheets

(56) References Cited

U.S. PATENT DOCUMENTS

| | | | | |
|---|---|---|---|---|
| 2015/0031404 A1* | 1/2015 | Yada | ............... | H04W 76/25 |
| | | | | 455/508 |
| 2015/0038086 A1* | 2/2015 | Kim | ............... | G06F 21/35 |
| | | | | 455/41.3 |
| 2015/0126115 A1* | 5/2015 | Yun | ............... | H04L 63/0876 |
| | | | | 455/41.1 |
| 2015/0355875 A1* | 12/2015 | Matsushita | ............... | G06F 3/1292 |
| | | | | 358/1.15 |
| 2018/0332586 A1* | 11/2018 | Takeuchi | ............... | H04W 76/10 |
| 2019/0387117 A1* | 12/2019 | Nishida | ............... | G06F 3/1221 |
| 2021/0100045 A1* | 4/2021 | Tsuji | ............... | H04W 76/11 |

\* cited by examiner

FIG. 8

| CONNECTION CANDIDATE AP ||
|---|---|
| SSID | PASSWORD |
| AP1 | xxxx |
| AP2 | yyyy |
| ⋮ | ⋮ |

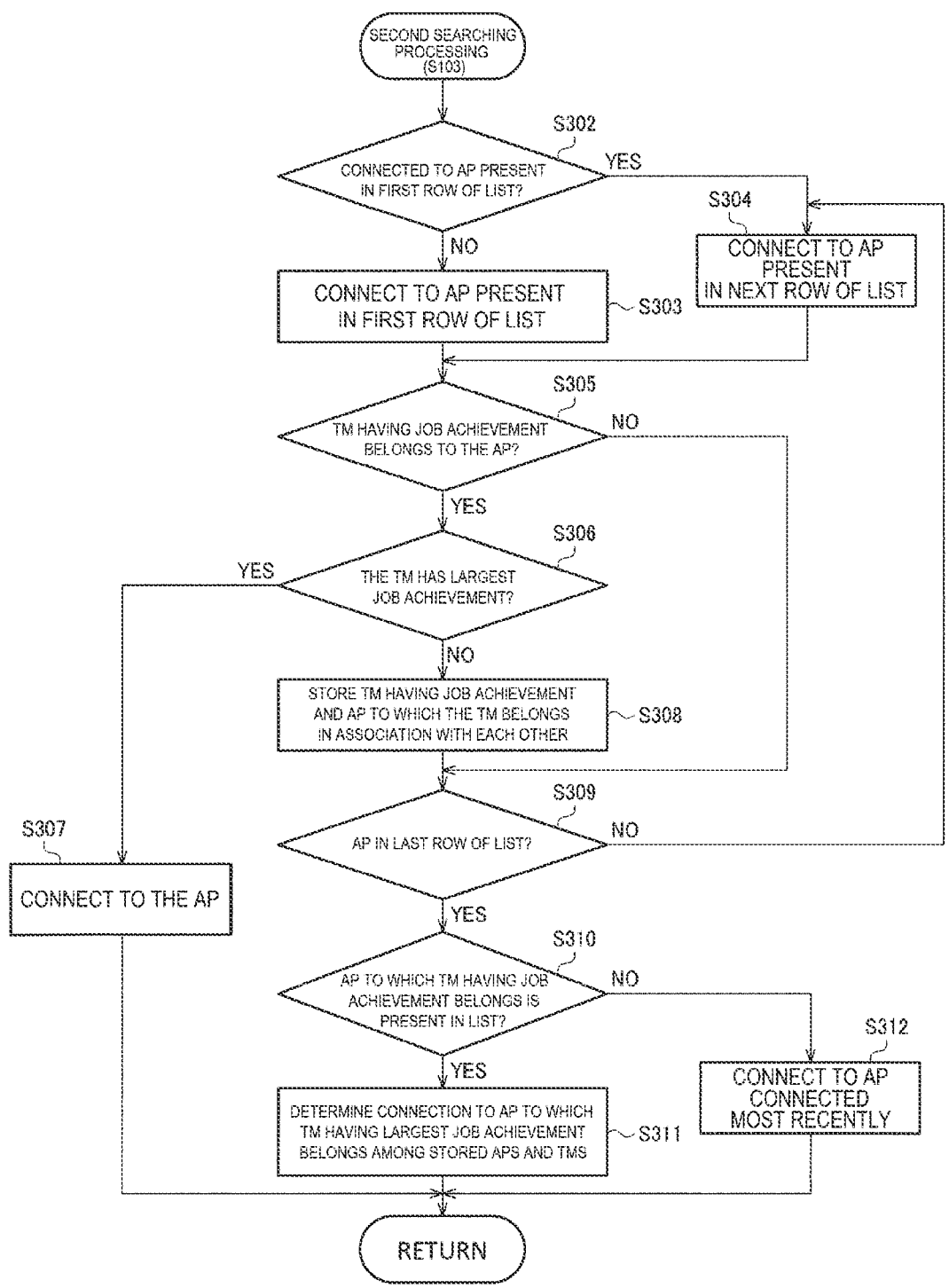

FIG. 10

| CONNECTION CANDIDATE AP | | TMS BELONGING TO APS | | | | PRIORITY |
|---|---|---|---|---|---|---|
| SSID | PASSWORD | TERMINAL DEVICE | IDENTIFICATION INFORMATION | JOB ACHIEVEMENT | | |
| | | | | NUMBER OF TIMES OF EXECUTION | OTHER SETTING ITEMS | |
| AP1 | xxxx | TM1 | AAA | 3 | — | 2 |
| AP2 | yyyy | TM2 | BBB | 2 | — | 3 |
| AP2 | yyyy | TM3 | CCC | 11 | — | 1 |
| ⋮ | ⋮ | ⋮ | ⋮ | ⋮ | ⋮ | ⋮ |

FIG. 11

| RECORD | CONNECTED AP | | CONNECTED TM | | TIME |
|---|---|---|---|---|---|
| | SSID | PASSWORD | TERMINAL DEVICE | IDENTIFICATION INFORMATION | |
| 1 | AP1 | zzzz | TM1 | AAA | 2020/1/17 16:30 |
| 2 | AP1 | zzzz | TM1 | AAA | 2020/1/23 12:00 |
| 3 | AP1 | zzzz | TM1 | AAA | 2020/1/24 13:00 |
| 4 | AP2 | yyyy | TM2 | BBB | 2020/1/14 16:00 |
| 5 | AP2 | yyyy | TM2 | BBB | 2020/1/16 10:00 |
| 6 | AP2 | yyyy | TM3 | CCC | 2020/1/25 10:45 |
| 7 | AP2 | yyyy | TM3 | CCC | 2020/1/25 13:10 |
| 8 | AP2 | yyyy | TM3 | CCC | 2020/1/25 17:20 |
| 9 | AP3 | xxxx | TM3 | CCC | 2020/1/14 14:30 |
| 10 | AP3 | xxxx | TM3 | CCC | 2020/1/15 10:20 |
| 11 | AP3 | xxxx | TM3 | CCC | 2020/1/15 16:30 |
| 12 | AP3 | xxxx | TM3 | CCC | 2020/1/16 10:15 |
| 13 | AP3 | xxxx | TM3 | CCC | 2020/1/17 15:05 |
| 14 | AP3 | xxxx | TM3 | CCC | 2020/1/21 15:30 |
| 15 | AP3 | xxxx | TM3 | CCC | 2020/1/22 10:30 |
| 16 | AP3 | xxxx | TM3 | CCC | 2020/1/23 13:00 |

ELECTRONIC APPARATUS AND WIRELESS COMMUNICATION METHOD TO CONNECT THE ELECTRONIC APPARATUS AND TERMINAL DEVICE TO SAME ACCESS POINT

The present application is based on, and claims priority from JP Application Serial Number 2020-059822, filed Mar. 30, 2020, the disclosure of which is hereby incorporated by reference herein in its entirety.

BACKGROUND

1. Technical Field

The present disclosure relates to an electronic apparatus, a wireless communication method, and the like.

2. Related Art

There have been known an electronic apparatus and a wireless communication method for performing wireless communication by automatically connecting to an access point. JP-A-2018-19285 (Patent Literature 1) discloses an electronic apparatus that, when wireless communication of the electronic apparatus is disconnected, preferentially connects to an access point to which the electronic apparatus connected most recently among access points having connection achievements present around the electronic apparatus.

However, in the electronic apparatus and a wireless communication method disclosed in Patent Literature 1, priority is only determined according to the strength of a radio wave when there are a plurality of connectable access points. A terminal device connected to the access points is not considered. Therefore, an access point to which the electronic apparatus is automatically connected and an access point to which a terminal device of a user is connected sometimes do not coincide. In this case, the user cannot connect the terminal device to the electronic apparatus via the access points. Eventually, the user needs to manually set connection to the electronic apparatus. The electronic apparatus is useless even if the electronic apparatus automatically connects to the access point.

SUMMARY

An aspect of the present disclosure relates to an electronic apparatus including: a wireless communication section configured to perform wireless communication; a storing section configured to store identification information of a terminal device to which the wireless communication section has an achievement of connection through a network; and a processing section configured to perform communication control for the wireless communication section. The processing section performs searching processing for external access points, performs second searching processing for searching for the terminal device corresponding to the identification information stored in the storing section in a network formed by the external access points found by the searching processing, and causes the wireless communication section to connect to the external access point to which the terminal device found by the second searching processing is connected.

Another aspect of the present disclosure relates to a wireless communication method by an electronic apparatus that performs wireless communication, the wireless communication method includes: performing searching processing for external access points; performing second searching processing for searching for a terminal device having an achievement of connection in a network formed by the external access points found by the searching processing; and connecting the electronic apparatus to the external access point to which the terminal device found by the second searching processing is connected.

BRIEF DESCRIPTION OF THE DRAWINGS

FIG. 8 is an example of a list of connection candidates of the external access point.

FIG. 9 is a flowchart for explaining another processing example of the second searching processing.

FIG. 10 is an explanatory diagram about job achievements and priority.

FIG. 11 is an example of job records, which are reference sources for determining the job achievements and the priority.

DESCRIPTION OF EXEMPLARY EMBODIMENTS

An embodiment is explained below. The embodiment explained below does not unduly limit contents of the present disclosure described in the appended claims. Not all of components explained in this embodiment are always essential constituent elements.

1. Configuration Example of a Wireless Communication System

Figure 1:
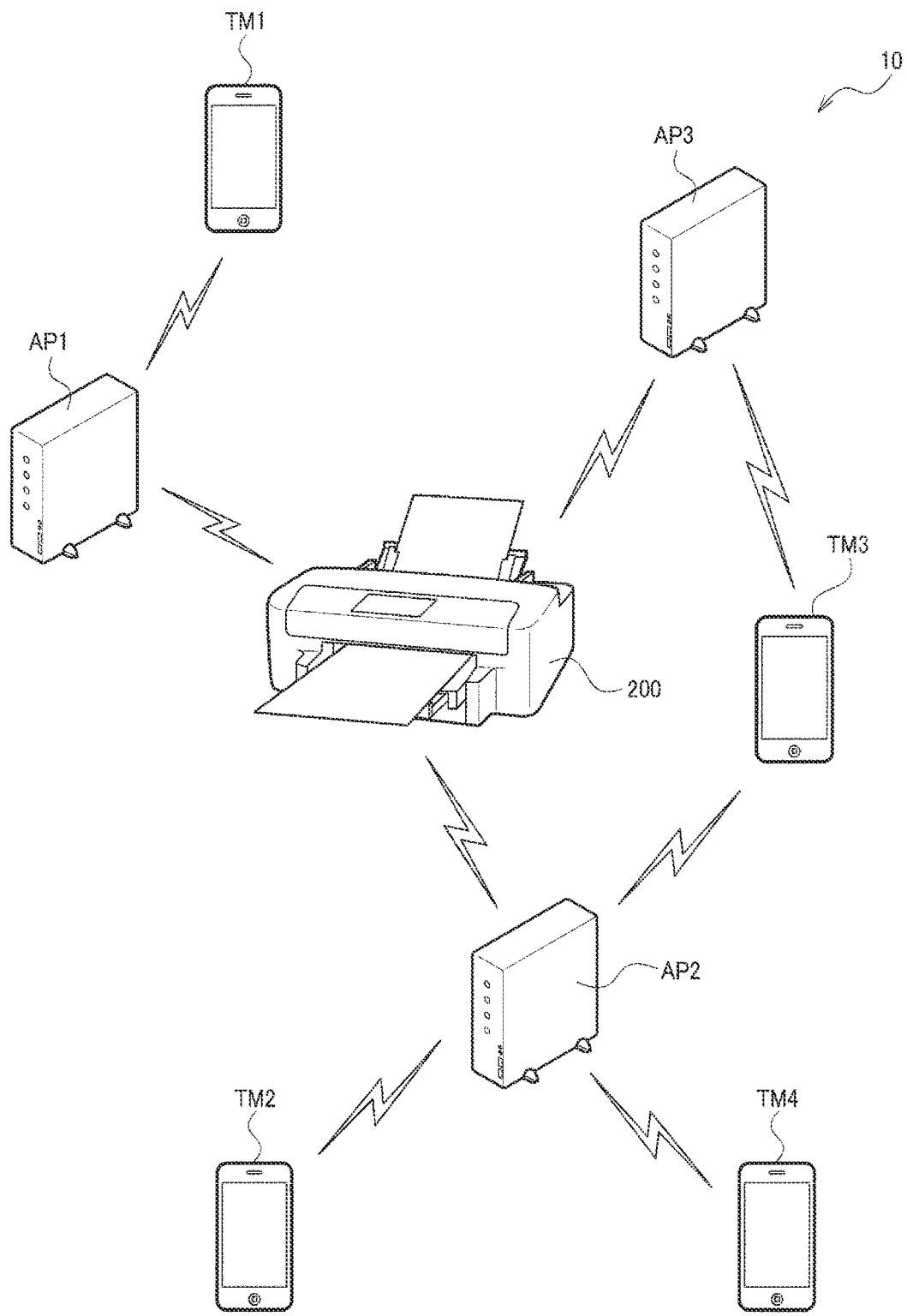
FIG. 1 is a configuration example of a wireless communication system.

FIG. 1 is a diagram schematically showing a configuration example of a wireless communication system 10 in this embodiment. The wireless communication system 10 includes an electronic apparatus 200, external access points AP1, AP2, and AP3, and terminal devices TM1, TM2, TM3, and TM4. In FIG. 1, the electronic apparatus 200 is connected to the external access points AP1, AP2, and AP3. The terminal device TM1 is connected to the external access point AP1, the terminal devices TM2 and TM4 are connected to the external access point AP2, and the terminal device TM3 is connected to the external access point AP3. That is, the terminal device TM1 belongs to a network of the external access point AP1, the terminal devices TM2 and TM4 belongs to a network of the external access point AP2, and the terminal device TM3 belongs to a network of the external access point AP3. The terminal device TM3 is connected to the external access point AP2 as well and belongs to the network of the external access point AP2 as well. In the following explanation, the external access points AP1, AP2, and AP3 are simply collectively referred to as external access point AP as appropriate. The terminal devices TM1, TM2, TM3, and TM4 are simply collectively referred to as terminal device TM as well. "Belongs to a network" is described as "belongs" as appropriate. For example, the terminal device TM present in a communicable ranges of the external access point AP belongs to a network of the external access point AP. In this embodiment, "communication connection conforming to a communication standard" is simply referred to as "connection" as appropriate. The wireless communication system 10 is not limited to the configuration shown in FIG. 1. Various modified implementations such as addition of other constituent elements are possible. For example, the number of external access points connected to the electronic apparatus 200 is optional. The number of terminal devices connected to the external access points is also optional. Like the terminal device TM3, one terminal device may belong to networks of a plurality of external access points.

The electronic apparatus 200 receives a predetermined job from the terminal device TM and performs execution processing for the job, for example, via a wireless network. The electronic apparatus 200 may perform the execution processing for the job not via the wireless network. The job includes, for example, a command or an instruction given from the terminal device TM to the electronic apparatus 200. The electronic apparatus 200 is, for example, a printer explained below but may be a personal computer, a wearable apparatus, a biological information measurement apparatus, a robot, a video apparatus, a personal information terminal, a physical quantity measurement apparatus, or the like. The wearable apparatus means a smartwatch, an activity tracker, or the like. The biological information measurement apparatus means a pulsimeter, a pedometer, or the like. The video apparatus means a camera, a projector, or the like. The portable information terminal means a smartphone, a tablet terminal, a portable game machine, or the like. The physical quantity measurement apparatus means a thermometer, a weight meter, or the like. The printer is, for example, an apparatus having a printing function but may have other functions. The other functions are, for example, a copy function, a scan function, or a facsimile function. The printer having the functions other than the printing function can be called a multifunction peripheral as well.

The external access point AP is a device that relays wireless communication of a device in the wireless network. For example, the electronic apparatus 200 and the terminal device TM are capable of wirelessly communicating via the external access point AP. The external access point AP periodically transmits a radio wave for wireless communication such as a beacon to enable identification information of the external access point AP to be decoded. The identification information of the external access point AP is, for example, an SSID (Service Set Identifier). When receiving a radio wave from the external access point AP, a user of the electronic apparatus 200 or the terminal device TM can connect to the external access point AP by inputting a predetermined password. When connecting to the same external access point AP again, the user can automatically connect to the external access point AP without inputting the password. The external access point AP can be called router as well.

The terminal device TM has a communication function such as wireless communication. The user of the terminal device TM can transmit a predetermined job from the terminal device TM to the electronic apparatus 200 via the wireless communication but may transmit the predetermined job via a wired network. The terminal device TM is, for example, the portable information terminal explained above but may be a personal computer or the like. The terminal device TM transmits, according to a wireless communication standard, data including identification information specific to the terminal device TM. The identification information specific to the terminal device TM is, for example, an IP address or a MAC address. Therefore, even if a plurality of terminal devices TM belong to the external access point AP, the plurality of terminal devices TM can be distinguished from one another.

2. Configuration Example of the Terminal Device

Figure 2:
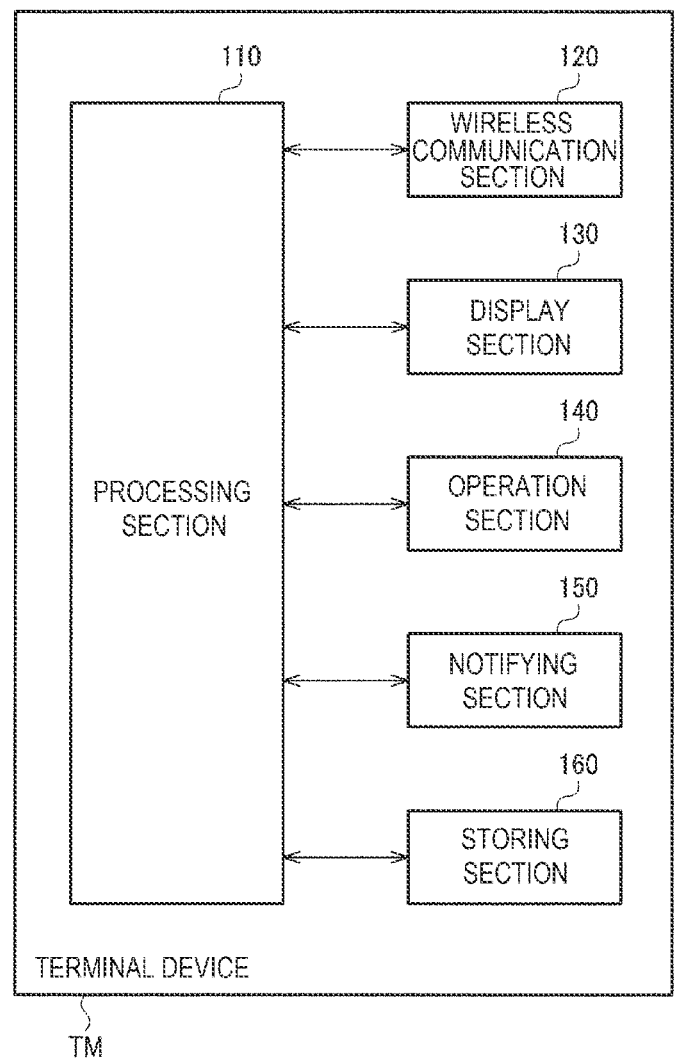
FIG. 2 is a block diagram showing a configuration example of a terminal device.

FIG. 2 is a block diagram showing a configuration example of the terminal device TM. The terminal device TM includes a processing section 110, a wireless communication section 120, a display section 130, an operation section 140, a notifying section 150, and a storing section 160.

The processing section 110 controls the wireless communication section 120, the display section 130, the operation section 140, the notifying section 150, and the storing section 160. Detailed explanation about a realized configuration of the processing section 110 is omitted because the realized configuration of the processing section 110 is the same as a realized configuration of a processing section 210 of the electronic apparatus 200 explained below.

The wireless communication section 120 is an interface that performs wireless communication with an external apparatus. The wireless communication section 120 can be realized by a semiconductor device having a wireless communication function conforming to a wireless communication standard. The wireless communication section 120 may be realized by an independent semiconductor device having a wireless communication function or may be realized as a part of functions of a semiconductor device having other functions as well. The wireless communication standard is a standard of a wireless LAN such as a Wi-Fi (registered trademark) standard but may be another wireless communication standard such as Bluetooth (registered trademark). When receiving a radio wave for wireless communication from the external access point AP, the wireless communication section 120 changes to a state in which the external access point AP and the terminal device TM are connectable by a password input by the user. When connecting to the same external access point AP again, the wireless communication section 120 is also capable of automatically connecting to the external access point AP. The automatically connecting to the external access point AP can be realized by, for example, the processing section 110 performing processing for storing the identification information and the password of the external access point AP in the storing section 160 explained below at a connection time in the past. The wireless communication section 120 may be able to select connection to the external access point AP and connection to a second wireless communication section 224, which is an internal access point, of the electronic apparatus 200 explained below.

The display section 130 is configured by a display or the like that displays various kinds of information to the user. Specifically, the display section 130 can be realized by, for example, a liquid crystal display but may be realized by an organic EL display, a dot matrix LED, or the like.

The operation section 140 receives input operation from the user. The operation section 140 can be realized by buttons, a keyboard, a touch sensor, a microphone for sound input, or the like. The display section 130 and the operation section 140 explained below may be configured as integral hardware by, for example, a touch panel.

The notifying section 150 performs notification concerning the terminal device TM to the user. The notifying section 150 can be realized by, for example, a speaker that outputs sound but may be realized by a vibration motor or a piezoelectric element that performs vibration, may be realized by an LED, a fluorescent lamp, or the like that emits light, or may be realized by a combination of the vibration motor or the piezoelectric element and the LED, the fluorescent lamp, or the like. The notification concerning the terminal device TM may be performed using both of the display section 130 and the notifying section 150.

The storing section 160 stores a program or data in the terminal device TM in advance or temporarily stores arithmetic operation content concerning the operation of the terminal device TM. The storing section 160 can be realized by a register, a semiconductor memory, a magnetic storage device, or an optical storage device. The semiconductor memory is, for example, a DRAM or an SRAM. The magnetic storage device is, for example, a HDD. The optical storage device is, for example, a CD-ROM or a DVD-ROM.

3. Configuration Example of the Electronic Apparatus

Figure 3:
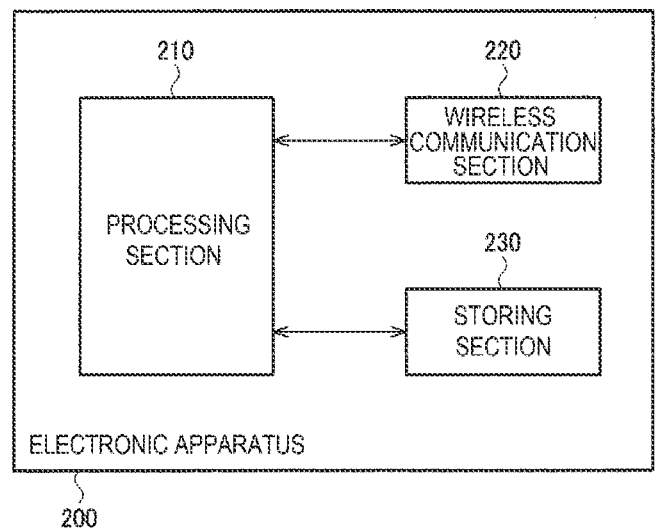
FIG. 3 is a block diagram showing a configuration example of an electronic apparatus.

FIG. 3 is a block diagram showing a configuration example of the electronic apparatus 200. The electronic apparatus 200 includes a processing section 210, a wireless communication section 220, and a storing section 230.

The processing section 210 controls the wireless communication section 220 and the storing section 230. The processing section 210 is specifically a processor or a controller. The processing section 210 can include a plurality of CPUs such as a main CPU and a sub-CPU. The main CPU performs control of the sections of the electronic apparatus 200 and overall control of the electronic apparatus 200. The sub-CPU is, for example, a CPU that performs communication control of the wireless communication section 220. When the electronic apparatus 200 is a printer, a CPU that performs various kinds of processing about printing may be further provided.

The processing section 210 in this embodiment is configured by hardware explained below. The hardware includes at least one of a circuit that processes a digital signal and a circuit that processes an analog signal. The hardware can be configured by, for example, one or a plurality of circuit devices or one or a plurality of circuit elements mounted on a circuit board. The circuit devices are, for example, integrated circuit devices. The circuit elements are, for example, resistors or capacitors.

The processing section 210 can be realized by a processor explained below. The electronic apparatus 200 in this embodiment includes a memory that stores information and a processor that operates based on the information stored in the memory. The information includes, for example, programs and various data. The processor includes hardware. As the processor, various processors such as a CPU (Central Processing Unit), a GPU (Graphics Processing Unit), and a DSP (Digital Signal Processor) can be used. The memory may be a semiconductor memory such as an SRAM (Static Random Address Memory) or a DRAM (Dynamic Random Access Memory), may be a register, may be a magnetic storage device such as a hard disk device, or may be an optical storage device such as an optical disk device. For example, the memory stores a command readable by a computer. The processor executes the command, whereby a function of the processing section 210 is realized as processing. The command may be a command of a command set configuring a program or may be a command for instructing a hardware circuit of the processor to perform operation. Further, the entire or a part of the processing section 210 may be realized by cloud computing. The processing section 210 in this embodiment performs processing for, when a job is sent from the terminal device TM belonging to the external access point AP, storing the identification information of the external access point AP and the identification information of the terminal device TM in the storing section 230 explained below.

When the electronic apparatus 200 is the printer explained above, the processing section 210 performs processing about a printing function, a scanner function, a facsimile function, or the like. The processing section 210 performs input and output of control between the processing section 210 and the wireless communication section 220, the storing section 230, a display section 240, an operation section 250, or a printing section 260 explained below. The processing section 210 may perform control between the processing section 210 and other hardware. The other hardware is, for example, a wired communication section, a copying section, a scanning section, or a facsimile section.

The wireless communication section 220 is an interface that performs wireless communication in the electronic apparatus 200. The wireless communication section 220 can be realized by a semiconductor device having a wireless communication function conforming to a wireless communication standard but may be realized by an independent semiconductor device having the wireless communication function or may be realized as a part of functions of a semiconductor device having other functions as well. The wireless communication standard is a standard of a wireless LAN such as Wi-Fi (registered trademark) but may be another wireless communication standard such as Bluetooth (registered trademark). When receiving a radio wave for wireless communication from the external access point AP, the wireless communication section 220 changes to a state in which the electronic apparatus 200 and the external access point AP are connectable by a password input by the user. When connecting to the same external access point AP again, the wireless communication section 220 is also capable of automatically connecting to the external access point AP. The automatically connecting to the external access point AP can be realized by, for example, the processing section 210 performing processing for storing the identification information and the password of the external access point AP in the storing section 230 explained below at connection time in the past.

When the electronic apparatus 200 is a printer explained below, the wireless communication section 220 receives a wireless communication radio wave from the external access point AP. The wireless communication section 220 receives information concerning a job from the terminal device TM or the like via the wireless communication radio wave and transmits the information concerning the job to the processing section 210.

The storing section 230 stores a program or data in the electronic apparatus 200 in advance or stores temporary arithmetic operation content concerning the operation of the terminal device TM. The program is, for example, searching processing or second searching processing explained below. The data is, for example, job records explained below. The temporary arithmetic operation content concerning the operation of the terminal device TM is, for example, a list of connection candidates in the searching processing explained below. The storing section 230 can be realized by a register, a semiconductor memory, a magnetic storage device, or an optical storage device. The semiconductor memory is, for example, a DRAM or an SRAM. The magnetic storage device is, for example, a HDD. The optical storage device is, for example, a CD-ROM or a DVD-ROM.

When the electronic apparatus 200 is the printer explained below, the storing section 230 stores information concerning the printer. The information concerning the printer is, for example, a record of a job from the terminal device TM but may be other information. The record of the job is, for example, the identification information of the external access point AP and the identification information of the terminal device TM explained above, a type of a job, an operation amount of the printer, or execution time of the job but may be another record. The type of the job is, for example, printing or facsimile. The operation amount of the printer is, for example, the number of prints or a consumed amount of ink or the like.

Figure 4:
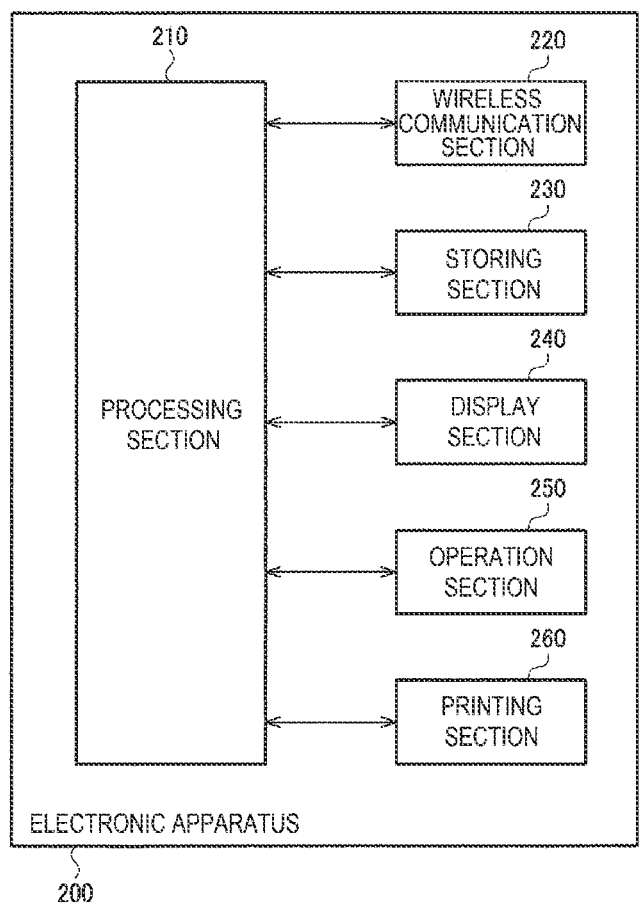
FIG. 4 is a block diagram showing a configuration example of a printer functioning as the electronic apparatus.

The electronic apparatus 200 shown in FIG. 3 may include other components. FIG. 4 is a block diagram showing a configuration example of the electronic apparatus 200, which is the printer. The following explanation is explanation about the electronic apparatus 200, which is the printer. The electronic apparatus 200 shown in the block diagram of FIG. 4 includes the processing section 210, the wireless communication section 220, the storing section 230, the display section 240, the operation section 250, and the printing section 260. Explanation about the processing section 210, the wireless communication section 220, and the storing section 230 is omitted because the sections are the same as those explained above. As explained above, the electronic apparatus 200 is applicable to apparatuses other than the printer.

The display section 240 displays information concerning the electronic apparatus 200. The display of the information concerning the electronic apparatus 200 is display concerning, for example, operation content, printing setting, a printing job history, or an operation state explained below. The display section 240 can be realized by, for example, a liquid crystal display but may be realized by an organic EL display, a dot matrix LED, or the like. The display section 240 can function as the operation section 250 explained below as well by including hardware such as a touch panel.

The operation section 250 receives input operation from the user. The operation section 250 can be realized by, for example, buttons or a touch sensor but may be realized by a microphone for sound input or the like. The operation section 250 and the display section 240 explained above may be configured as, for example, integral hardware by a touch panel.

The printing section 260 performs printing of an image on a printing medium. The printing medium is paper, cloth, or the like. The printing section 260 is realized by, for example, a printing engine. The printing engine is, for example, an ejection head of an inkjet scheme but may include, for example, a driving mechanism of a carriage including the ejection head. The printing engine prints an image on the printing medium conveyed by a conveying mechanism by ejecting ink from the ejection head onto the printing medium. The printing engine may perform printing with toner in a laser scheme. The printing section 260 may include a sensor that detects various physical quantities concerning an operation state of the printing engine or a counter that counts a detection result. The processing section 210 acquires information such as a driving amount of the conveying mechanism, the number of times of reciprocation of the ejection head, or a consumed amount of the ink using, for example, the sensor or the counter and causes the storing section 230 to store the information.

4. Processing Example for Determining an External Access Point to be Connected

Figure 5:
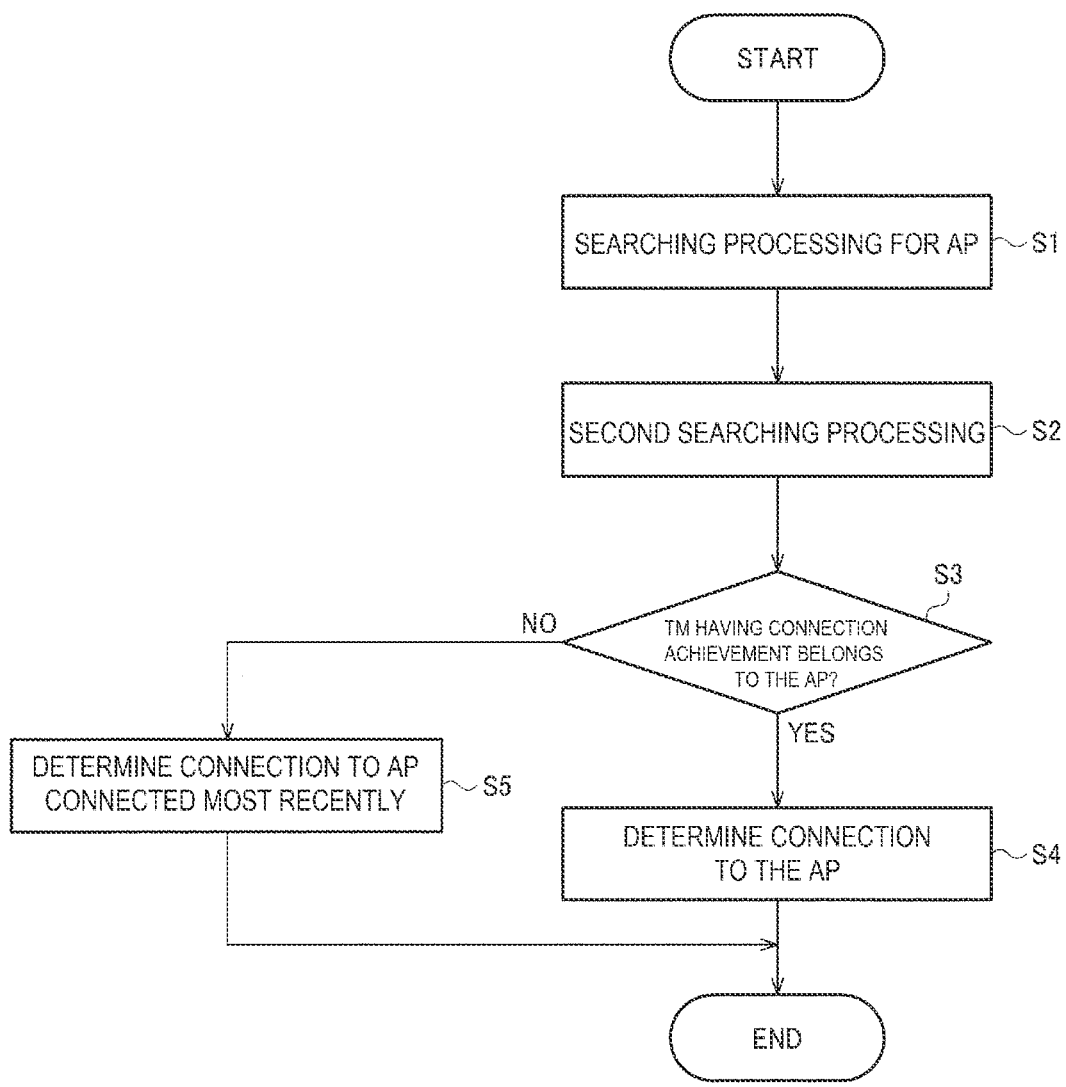
FIG. 5 is a flowchart for explaining a processing example for determining an external access point to be connected.

FIG. 5 is a flowchart showing a processing example for determining the external access point AP to be connected to the wireless communication section 220. The processing section 210 of the electronic apparatus 200 executes the processing. In FIG. 5, the external access point AP is simply abbreviated and described as AP and the terminal device TM is simply abbreviated and described as TM. Connecting the external access point AP and the wireless communication section 220 is abbreviated and described as connection to AP. The same applies to FIGS. 6, 7, 9, 10, and 11.

When wireless connection is cut off and is performed again, the processing section 210 performs searching processing (S1) for the external access point AP. Specifically, the processing section 210 performs SSID scan. The wireless connection is cut off and performed again, for example, when a power supply is turned on. The searching processing is, for example, processing for searching for the external access point AP having a connection achievement. In other words, the searching processing is processing for searching for the external access point AP to which automatic connection is possible. The searching processing can be realized by, for example, the wireless communication section 220 extracting an SSID of the external access point AP from a packet received from the external access point AP by wireless communication and determining whether the SSID and an SSID stored in advance in the storing section 230 coincide.

The processing section 210 performs second searching processing (S2) after the searching processing (S1) for the external access point AP. The second searching processing is processing for determining whether the terminal device TM having a connection achievement belongs to a network formed by the external access point AP found in the searching processing (S1). As explained below, various modified implementations of the second searching processing are possible. The determination about whether the terminal device TM having a connection achievement belongs to the network can be realized by, for example, the processing section 210 determining whether identification information of the terminal device TM belonging to the external access point AP and identification information of the terminal device TM stored in advance in the storing section 230 coincide. Specifically, when determining in the second searching processing that the terminal device TM having a connection achievement belongs to the external access point AP (YES in S3), the processing section 210 determines to connect the external access point AP and the wireless communication section 220 (S4). As explained below, if the terminal device TM has a job achievement, the terminal device TM also has a connection achievement.

On the other hand, when determining that the terminal device TM having a connection achievement does not belong to the external access point AP (NO in S3), the processing section 210 determines to connect the external access point AP connected most recently and the wireless communication section 220 (S5). The determining to connecting the external access point AP and the wireless communication section 220 is, for example, establishing connection to the external access point AP. Specifically, after performing transmission of an authentication request and reception of a response to the authentication request, the processing section 210 performs transmission of a connection request called association request and reception of a response to the connection request. When encryption is necessary, the processing section 210 performs exchange of an encryption key called four-way handshake and establishes connection to the external access point AP. The external access point AP connected most recently is the external access point AP wirelessly connected most lately before the searching processing in this embodiment is started. The same applies to the following explanation and flowcharts. When failing in connecting to the external access point AP connected most recently within a fixed period, the processing section 210 may execute error notification.

In this way, the electronic apparatus 200 includes the wireless communication section 220 that performs wireless communication, the storing section 230 that stores identification information of a terminal device having an achievement of connection by the wireless communication section 220 through the network, and the processing section 210 that performs the communication control for the wireless communication section 220. Therefore, the electronic apparatus 200 can execute processing by wireless communication with the terminal device TM. Consequently, the user of the terminal device TM is capable of performing, for example, remote operation to the electronic apparatus 200 via a wireless network. The processing section 210 performs the searching processing for the external access point AP and performs, in the network formed by the external access point AP found by the searching processing, the second searching processing for searching for the terminal device TM corresponding to the identification information stored in the storing section 230. The processing section 210 causes the wireless communication section 220 to connect to the external access point AP to which the terminal device TM found by the second searching processing is connected. Consequently, the processing section 210 can determine based on the identification information stored in the storing section 230 whether the terminal device TM having a connection achievement is present in the network formed by the external access point AP found by the searching processing. When the terminal device TM having a connection achievement does not belong to the found external access point AP, the wireless communication section 220 is not connected to the external access point AP. When the terminal device TM having a connection achievement belongs to the found external access point AP, the wireless communication section 220 is connected to the external access point AP. Therefore, the wireless communication section 220 can be connected to the external access point AP to which the terminal device TM having a connection achievement is connected. Connection processing to the external access point AP considering, for example, the connection achievement of the terminal device TM can be realized. Consequently, it is possible to accurately search for, through the searching processing and the second searching processing, the external access point AP that is highly likely to be used by the user again. Therefore, it is highly likely that the electronic apparatus 200 and the terminal device TM that the user desires to connect to the external apparatus 200 belong to the same external access point AP and the electronic apparatus 200 and the terminal device TM can automatically connect to each other. Accordingly, it is also possible to reduce a burden on the user in wireless connection work.

Figure 6:
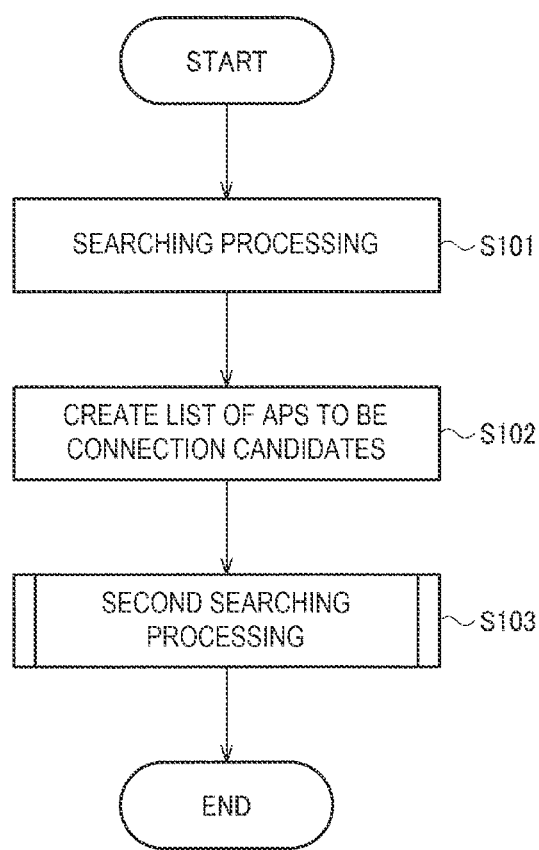
FIG. 6 is a flowchart for explaining another processing example for determining an external access point to be connected.
Figure 7:
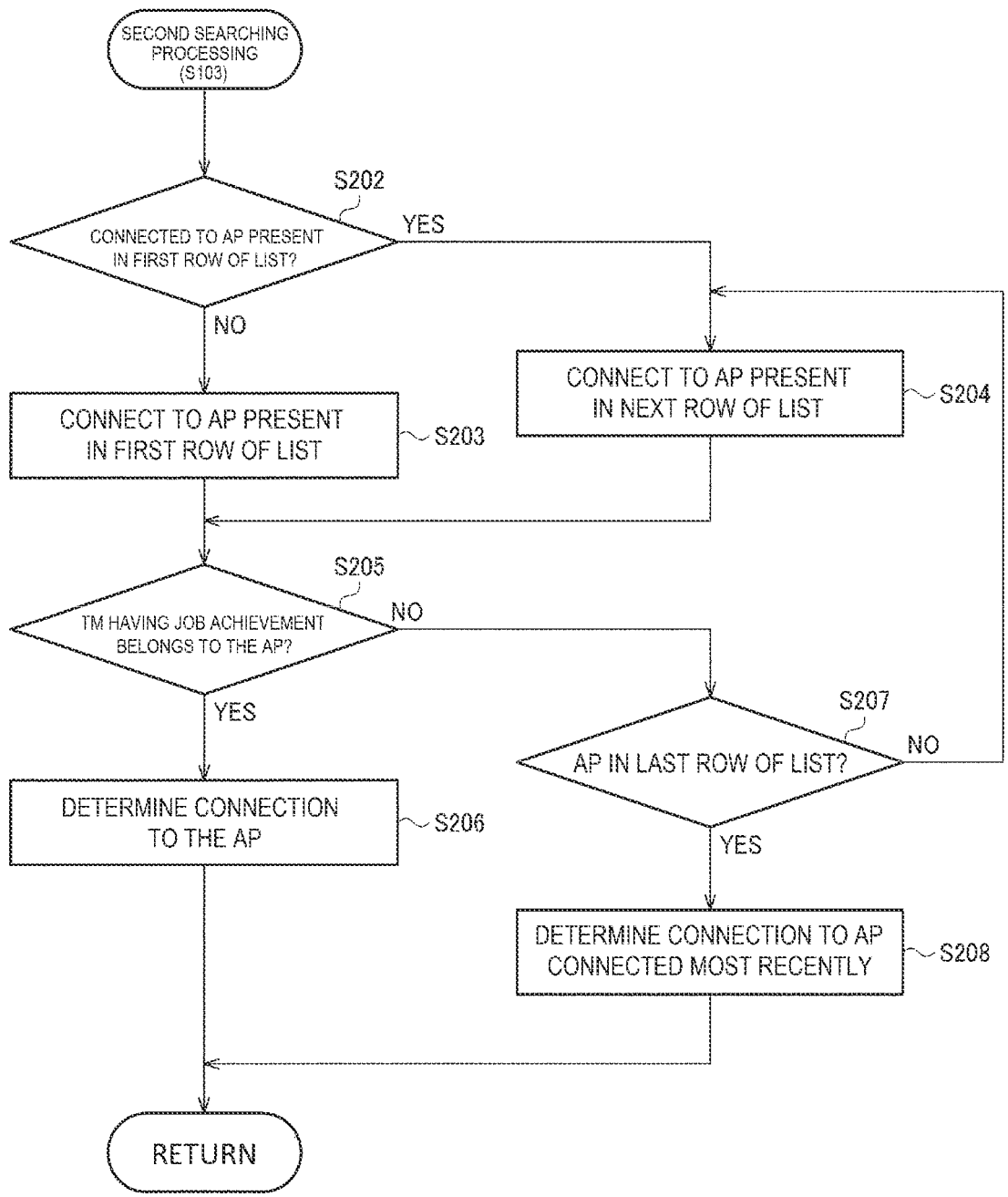
FIG. 7 is a flowchart for explaining a processing example of second searching processing.

The processing section 210 may perform, according to flowcharts of FIGS. 6 and 7, processing for determining the external access point AP. A part of explanation about processing common to FIG. 5 is omitted.

As shown in FIG. 6, as in S1 in FIG. 5, when wireless connection is cut off and performed again, the processing section 210 performs searching processing (S101) for the external access point AP. The processing section 210 creates a list of connection candidates of the external access point AP shown in FIG. 8 (S102). In the flowcharts of FIGS. 6 and 7, the list of connection candidates is abbreviated and described as list as appropriate. The same applies to FIG. 9. The creation of the list of connection candidates can be realized by, for example, a method of temporarily storing, in a predetermined storage region of the storing section 230, an SSID coinciding with an SSID stored in the storing section 230 among SSIDs extracted from a packet received by the wireless communication section 220. The number of the external access points AP cited in the list of connection candidates may be one or may be two or more. The processing section 210 may poll processing for creating the list of connection candidates or may periodically update the list of connection candidates after the processing in S102 and subsequent steps is started.

FIG. 7 is a flowchart showing the second searching processing (S103) in detail. The processing section 210 performs processing for sequentially automatically connecting to external access points of the list of connection candidates created in S102 in FIG. 6. Specifically, the processing section 210 determines whether the wireless communication section 220 is already connected to the external access point AP present in the first row of the lists of connection candidates and, when determining that the wireless communication section 220 is not connected to the external access point AP present in the first row of the list of connection candidates (NO in S202), the processing section 210 automatically connects the external access point AP present in the first row of the list of connection candidates and the wireless communication section 220 (S203). When the wireless communication section 220 is already connected to the external access point AP present in the first row of the list of connection candidates (YES in S202), the processing section 210 automatically connects the external access points AP present in the next row of the list of connection candidates and the wireless communication section 220 (S204).

When the terminal device TM having a job achievement belongs to the connected external access point AP (YES in S205), the processing section 210 determines to connect the external access point AP and the wireless communication section 220 (S206) and ends the second searching processing.

When the terminal device TM having a job achievement does not belong to the connected external access point AP (NO in S205), the processing section 210 determines whether the external access point AP is the external access point AP in the last row of the list of connection candidates (S207). The terminal device having a job achievement is also a terminal device having a connection achievement. When the external access point AP is the external access point AP in the last row of the list of connection candidates (YES in S207), the processing section 210 determines to connect the external access point AP connected most recently and the wireless communication section 220 (S208) and ends the second searching processing. That is, connection between the external access point AP and the wireless communication section 220 is established. On the other hand, when the external access point AP is not the external access point AP in the last row of the list of connection candidates (NO in S207), the processing section 210 performs processing for automatically connecting the external access point AP present in the next row of the list of connection candidates and the wireless communication section 220 (S204). For example, when the terminal device TM does not belong to the external access point AP1 present in the first row of the list of connection candidates as shown in FIG. 8, the processing section 210 performs processing for automatically connecting the wireless communication section 220 to the external access point AP2.

In this way, when a first external access point and a second external access point are found by the searching processing, the processing section 210 connects the wireless communication section 220 to the first external access point and determines whether the terminal device TM corresponding to identification information of the first external access point is connected to the first external access point. The processing section 210 performs the second searching processing by connecting the wireless communication section 220 to the second external access point and determining whether the terminal device TM corresponding to identification information of the second external access point is connected to the second external access point. For example, the first external access point is AP1 shown in FIG. 8 and the second external access point is AP2 shown in FIG. 8. As shown in FIG. 7, for example, the processing section 210 connects the wireless communication section 220 to the external access point AP1 present in the first row of the list and determines whether the terminal device TM corresponding to identification information of the external access point AP1 is connected to the external access point AP1. That is, the processing section 210 determines whether the terminal device TM having a connection achievement, in a narrow sense, a job achievement is connected to the external access point AP1. For example, the processing section 210 connects the wireless communication section 220 to the external access point AP2 present in the next row of the list and determines whether the terminal device TM corresponding to identification information of the external access point AP2 is connected to the external access point AP2. That is, the processing section 210 determines whether the terminal device TM having a connection achievement, in a narrow sense, a job achievement is connected to the external access point AP2. Consequently, when a plurality of external access points AP1 and AP2 are found by the searching processing, the processing section 210 can determine whether the terminal device TM having a connection achievement belongs to the external access points AP1 and AP2 and connect the wireless communication section 220 to the external access points AP1 and AP2. For example, as shown in FIG. 7, even if the terminal device TM having a job achievement does not belong to the external access point AP1, the processing section 210 also checks a job achievement of the terminal device TM belonging to the external access point AP2 without immediately connecting the wireless communication section 220 to the external access point AP connected most recently. Consequently, when a plurality of connectable external access points AP are present, it is highly likely that the electronic apparatus 200 and the terminal device TM that the user desires to wirelessly connect to the electronic apparatus 200 belong to the same external access point AP and the electronic apparatus 200 and the terminal device TM can automatically connect to each other. Therefore, it is possible to reduce a burden on the user in wireless connection work.

The processing section 210 may execute the second searching processing (S103) according to a flowchart of FIG. 9. Processing of a determination method for the external access point AP is explained below according to the flowcharts of FIGS. 6 and 9. A part of explanation is omitted about processing common to the above explanation such as the searching processing shown in FIG. 6.

First, as in S202 to S204 in FIG. 7, the processing section 210 determines whether the wireless connection section 220 is already connected to the external access point AP present in the first row of the list of connection candidates and, when determining that the wireless connection section 220 is not connected to the external access point AP present in the first row of the list of connection candidates (NO in S302), the processing section 210 connects the external access point AP present in the first row of the list of connection candidates and the wireless communication section 220 (S303). Similarly, when determining that the wireless connection section 220 is connected to the external access point AP present in the first row of the list of connection candidates (YES in S302), the processing section 210 connects the external access point AP present in the next row of the list of connection candidates and the wireless communication section 220 (S304).

The processing section 210 determines whether the terminal device TM having a job achievement belongs to the connected external access point AP (S305). When determining that the terminal device TM having a job achievement belongs to the external access point AP (YES in S305), the processing section 210 determines whether the terminal device TM is the terminal device TM having the largest job achievement (S306). The determination about whether the terminal device TM is the terminal device TM having the largest job achievement can be realized by, for example, storing, in the storing section 230, in advance, information in which identification information of the terminal device TM and priority explained below are associated and comparing the information and identification information of the terminal device TM obtained in S305 but may be realized by another method. When determining that the terminal device TM is the terminal device TM having the largest job achievement (YES in S306), the processing section 210 determines to connect the external access point AP and the wireless communication section 220 (S307) and ends the second searching processing. For example, the processing section 210 determines, from FIG. 10 and the like referred to below, that the terminal device TM3, priority of which is 1, belongs to the external access point AP2 and determines to connect the external access point AP2 and the wireless communication section 220.

When determining that the terminal device TM having a job achievement belonging to the connected external access point AP is not the terminal device TM having the largest job achievement (NO in S306), the processing section 210 stores the terminal device TM and the external access point AP to which the terminal device TM belongs in association with each other (S308). For example, information indicating that priority of the terminal device TM1 is 2, in other words, information indicating that a job achievement of the terminal device TM1 is not the largest is stored in advance in the storing section 230. As shown in FIG. 10, through the processing in S308, the information is temporarily stored in any region of the storing section 230 together with information concerning the external access point AP1 to which the terminal device TM1 belongs. It is not determined yet to connect the external access point AP1 and the wireless communication section 220.

When determining the terminal device TM having a job achievement does not belong to the connected external access point AP (NO in S305) or when performing the processing in S308, the processing section 210 determines whether the connected external access point AP is the external access point AP in the last row of the list of connection candidates (S309). When determining that the connected external access point AP is not the external access point AP in the last row (NO in S309), the processing section 210 automatically connects the external access point AP present in the next row of the list of connection candidates and the wireless communication section 220 (S304).

When determining that the connected external access point AP is the external access point AP in the last row of the list of connection candidates (YES in S309), the processing section 210 determines whether the external access point AP to which the terminal device TM having a job achievement belongs is present in the list of connection candidates (S310). When the external access point AP to which the terminal device TM having a job achievement belongs is absent, the processing section 210 determines to connect the external access point AP connected most recently and the wireless communication section 220 (S312). On the other hand, when the external access point AP is present, the processing section 210 determines to connect the wireless communication section 220 to the external access point AP, to which the terminal device TM having the largest job achievement belongs, of the external access point AP and the terminal device TM stored in S308 (S311). For example, the processing section 210 determines to connect the external access point AP to which the terminal device TM having the largest job achievement, in other words, the terminal device TM having the highest priority explained below belongs and the wireless communication section 220. For example, in FIG. 10, when the terminal device TM3 belongs to no external access point AP, the processing section 210 determines to connect the external access point AP1 to which the terminal device TM1, connection priority of which is 2, belongs and the wireless communication section 220.

The priority shown in FIG. 10 is explained. The priority is a scale of a job achievement of the terminal device TM with respect to the electronic apparatus 200. In this embodiment, a number of the priority is displayed smaller for the terminal device TM having a higher job achievement. For example, the storing section 230 stores priority of the terminal device TM having the largest job achievement as 1. The job achievement is determined by, for example, a method explained below based on, for example, jobs stored in the storing section 230 in a record form shown in FIG. 11. In the following explanation, the jobs in the form shown in FIG. 11 are referred to job records.

In this way, the storing section 230 stores the identification information of the terminal device TM and job achievement information representing an achievement of a job concerning the terminal device TM in association with each other. Consequently, the terminal device TM can be compared using not only a connection achievement but also superiority and inferiority of a job achievement. Searching accuracy for the external access point AP to which the user desires to connect is improved. Consequently, since the processing section 210 causes the wireless communication section 220 to connect to an external access point determined based on the second searching processing and the job achievement, it is highly likely that the external access point AP to which the terminal device TM with a high job achievement belongs and the electronic apparatus 200 can be connected. Consequently, it is highly likely that the external access point AP to which the user of the terminal device TM desires to connect and the external access point AP connected to the electronic apparatus 200 coincide. It is possible to reduce a burden on the user in the wireless connection work.

When the plurality of terminal devices TM1, TM2, and TM3 are found by the second searching processing, the processing section 210 causes the wireless communication section 220 to connect to the external access point AP2 to which the terminal device TM3 determined based on job achievement information among the found plurality of terminal devices TM1, TM2, and TM3 is connected. Consequently, even if a plurality of terminal devices TM having job achievements are found, since the processing section 210 relatively compares superiority and inferiority of the job achievements and determines the external access point AP to which the terminal device TM having the highest job achievement belongs, searching accuracy for the external access point AP to which the user desires to connect is improved. Consequently, since the processing section 210 causes the wireless communication section 220 to connect to the external access point AP determined based on the second searching processing and the job achievement, it is highly likely that the external access point AP to which the terminal device TM having a high job achievement belongs and the electronic apparatus 200 can be connected. Consequently, it is highly likely that the external access point AP to which the user of the terminal device TM desires to connect and the external access point AP connected to the electronic apparatus 200 coincide. It is possible to reduce a burden on the user in the wireless connection work.

Subsequently, a determination method for priority is explained. Determination of priority can be realized by, for example, creating various parameters based on the job records shown in FIG. 11 and comparing the parameters. For example, it is possible to create the numbers of times of jobs of the terminal devices TM based on the number of job records and realize the determination of priority based on the numbers of times of the jobs. However, the determination of priority can also be realized by other methods. For example, as shown in FIG. 11, the number of times of jobs of the terminal device TM1 is three, the number of times of jobs of the terminal device TM2 is two, and the number of times of jobs of the terminal device TM3 is eleven. Accordingly, as shown in FIG. 10, priority of TM1 is 2, priority of TM2 is 3, and priority of TM3 is 1.

The priority may be determined based on a parameter other than the number of times of jobs. Examples of the parameter other than the number of times of jobs include job execution timing. For example, time when a job is stored may be set as the job execution timing. Consequently, specific irrationality can be avoided. The specific irrationality is that, for example, the processing section 210 causes the wireless communication section 220 to connect to the external access point AP to which the terminal device TM is less likely to be connected in the present situation.

The priority may be determined based on a plurality of parameters. For example, the job achievement may be determined based on combined parameters of a predetermined period and the number of times of job execution.

As shown in FIG. 11, when causing the storing section 230 to store a processing result of S308 explained above, the processing section 210 may store two parameters for determining the priority or may be able to optionally set storage of one parameter of the two parameters. The processing section 210 may be able to set three or more parameters for determining the priority.

If the electronic apparatus 200 is a printer, the job achievement may be a printing job achievement. That is, the number of times of job execution may be the number of times of printing execution. The printing job achievement may include printing timing.

The processing section 210 may determine the printing job achievement through comprehensive consideration. The comprehensive consideration is, for example, determining the printing job achievement considering a required time for printing, the number of pieces of printed paper, or a consumed amount of a consumable such as toner. Consequently, since a load applied to the printer can be considered, comparison accuracy for the terminal device TM having a high job achievement is improved.

The processing section 210 may add limitation processing for limiting the printing job achievement to only a printing job and not including a job by a function other than the printing function in the printing job achievement. The limitation processing may be applied to a facsimile function or the like other than the printing function.

The processing section 210 may be able to change the parameters of the job achievement according to the printing function, the facsimile function, and the like. For example, the printing function may determine the job achievement based on the number of times of execution. The facsimile function may determine the job achievement based on execution timing.

The processing section 210 may be able to forcibly set a specific terminal device TM as the terminal device TM having the largest job achievement. Further, the processing section 210 may perform imparting processing for imparting job achievements different in priority to the plurality of terminal devices TM in advance. The imparting processing is, for example, in a workplace, setting, in advance, priority of the terminal device TM of a user in the highest position to 1 and setting priority of the terminal device TM of a user in the next highest position to 2.

In this way, the job achievement information may be at least one of the number of times of job execution and the job execution timing. Consequently, since the scale for determining a job achievement is specified, it is possible accurately compare job achievements of the terminal devices TM and appropriately search for, with the searching processing and the second searching processing, the external access point AP that should be connected. It is possible to make it highly likely to match the external access point AP to which the user of the terminal device TM desires to connect and the external access point AP to which the external device 200 connects. Therefore, it is possible to reduce a burden on the user in the wireless connection work.

If the electronic apparatus 200 is a printer, the job may be a printing job. The job achievement information may be at least one of the number of times of printing execution and printing timing. Consequently, since a scale for determining a job achievement is specified, it is possible to accurately compare job achievements of the terminal devices TM and appropriately search for, with the searching processing and the second searching processing, the external access point AP that should be connected. It is possible to make it highly likely to match the external access point AP to which the user of the terminal device TM desires to connect and the external access point AP to which the printer automatically connects.

FIGS. 5, 6, 7, and 9 show a method of determining, based on individual job achievements of the terminal device TM, the external access point AP to be connected. However, various modifications of a determination method for the external access point AP are possible. For example, job achievements of all the terminal devices TM belonging to the same external access point AP may be comprehensively compared to determine the external access point AP to be connected. For example, although not illustrated, the number of connectable external access points AP is represented as N and the number of turns is represented as M. It is assumed that two (N=2) external access points AP, that is, a first external access point AP1 (M=1) and a second external access point AP2 (M=2) are present as the connectable external access points AP. It is assumed that only one (L=1) terminal device TM1 having the largest job achievement belongs to the first external access point AP1 and eight (L=8) terminal devices TM2 to TM9 having medium job achievements belong to the second external access point AP2. It is assumed that the terminal devices TM1 to TM9 individually have job achievements. In this case, the processing section 210 may comprehensively compare one job achievement by the terminal device TM1 and eight job achievements by the terminal devices TM2 to TM9 to respectively calculate priority information of the first external access point AP1 to which the terminal device TM1 belongs and the second external access point AP2 to which the terminal devices TM2 to TM9 belong and determine, based on the priority information, to which external access point AP the wireless communication section 220 is connected. N only has to be an integer equal to or larger than 2. M only has to be an integer equal to or larger than 1 and equal to or smaller than N. L only has to be an integer equal to or larger than 1.

In this way, the external access points, the terminal devices TM belonging to which are found by the second searching processing, are the first external access point AP1 and the second external access point AP2. In this case, when the eight terminal devices TM2 to TM9 are found in a network formed by the second external access point, the processing section 210 calculates, based on eight kinds of job achievement information corresponding to the found eight terminal devices, priority information representing connection priority of the second external access point. The processing section 210 determines, based on the priority information, an external access point to which the wireless communication section 220 is connected. Consequently, it is possible to comprehensively determine job achievements of the terminal devices.

For example, it is seen from the job records shown in FIG. 11 that, as connection achievements of the terminal devices TM to the electronic apparatus 200, a connection achievement by the terminal device TM3 through the external access point AP3 is predominantly high. Therefore, in creating a list of connection candidates, the processing section 210 may add processing for arranging, in the first row of the list, the external access point AP3 having a high connection achievement to the terminal device TM3 having the largest job achievement. Consequently, the terminal device TM3 having the largest job achievement can be found by one searching processing (YES in S306). Therefore, it is possible to connect the terminal device TM3 and the wireless communication section 220 (S307) and end the flow earlier. Therefore, it is possible to reduce a processing time.

Further, the processing section 210 may add processing for determining, considering timing of a job achievement, the external access point AP in the first row of the list of connection candidates. For example, as shown in FIG. 11, the terminal device TM3 having the largest number of times of jobs belongs to the external access point AP2 most recently. Therefore, the external access point AP2 may be placed in the first row of the list of connection candidates.

To consider the timing of the job achievement, a predetermined condition may be further provided. The predetermined condition is that, for example, the terminal device TM3 belongs to the external access point AP2 continuously for a fixed period. Consequently, a specific situation can be considered. The specific situation is, for example, a situation in which an event where the terminal device TM3 having the largest number of times of jobs belonged to the external access point AP2 most recently was simply a temporary event.

The processing section 210 may be able to optionally execute processing that can correct or delete a part or all of the job records shown in FIG. 11. Consequently, for example, unnecessary information such as information concerning an unnecessary terminal device TM and error information can be deleted. Therefore, it is possible to improve accuracy of a job achievement and secure a storage capacity of the storing section 230.

Figure 12:
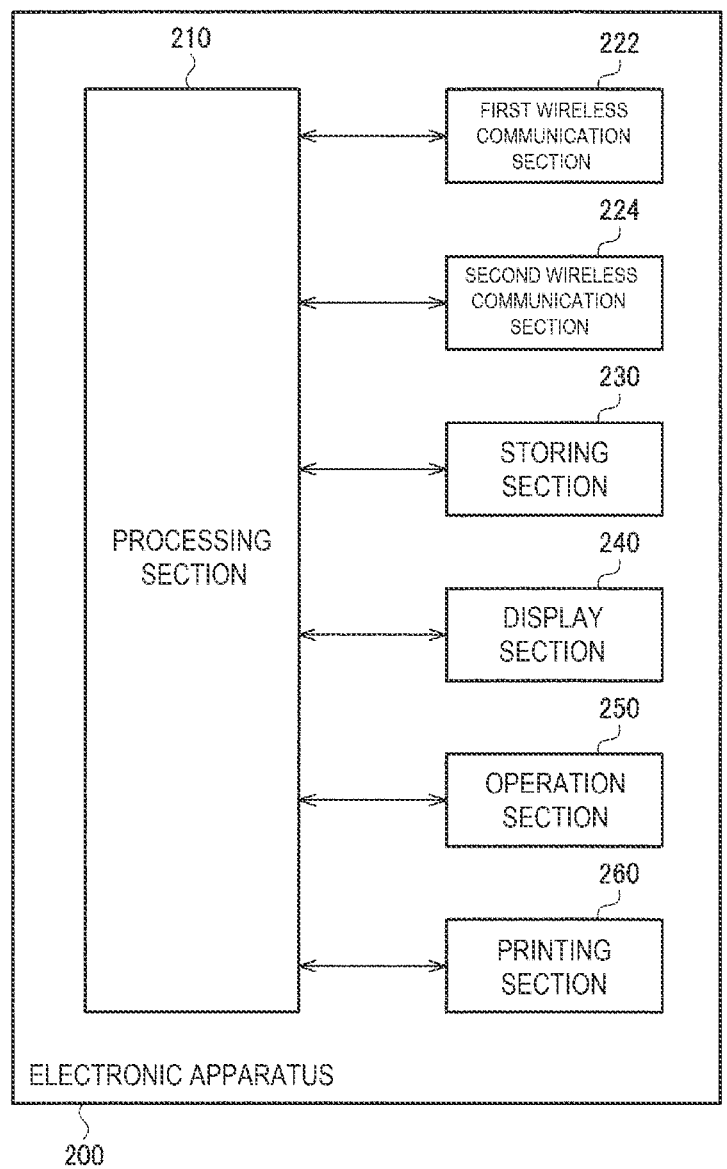
FIG. 12 is another configuration example of a functional block diagram of the electronic apparatus.

5. Configuration Example Including an Electronic Apparatus Including a Second Wireless Communication Section The electronic apparatus 200 in this embodiment may include a first wireless communication section 222 and a second wireless communication section 224 as shown in a block diagram of FIG. 12. Explanation about the processing section 210, the storing section 230, the display section 240, the operation section 250, and the printing section 260 is omitted because the sections are the same as those explained above.

The first wireless communication section 222 has a function capable of executing wireless communication with the external access point AP. The first wireless communication section 222 executes wireless communication conforming to a wireless LAN scheme such as a Wi-Fi (registered trademark) scheme but may execute wireless communication in another wireless communication standard scheme.

The second wireless communication section 224 has a function capable of executing wireless communication not via the external access point AP. The second wireless communication section 224 executes wireless communication conforming to, for example, a Wi-Fi Direct (registered trademark) scheme but may execute wireless communication in another wireless communication standard scheme. The second wireless communication section 224 includes a not-shown internal access point. When the second wireless communication section 224 functions, the electronic apparatus 200 itself operates as an access point. The first wireless communication section 222 and the second wireless communication section 224 can be respectively realized by different semiconductor elements but may be realized by the same semiconductor element.

Incidentally, when the determination method for the external access point AP explained above is directly applied to such an electronic apparatus 200, an event where a job achievement through an external access point and a job achievement using an internal access point are mixed in the storing section 230 occurs. In this case, the processing section 210 cannot accurately grasp a job achievement via the external access point AP. Accordingly, when the user of the terminal device TM desires to connect to the electronic apparatus 200 using the external access point AP, the user cannot accurately search for the terminal device TM having high connection priority and the external access point AP that should be connected. The user of the terminal device TM desires to connect to the electronic apparatus 200 using the external access point AP, for example, when a deficiency occurs in the second wireless communication section 224 of the electronic apparatus 200 or when a deficiency occurs in the wireless communication section 120 on the terminal device TM side.

Therefore, for example, the processing section 210 may perform processing for causing the storing section 230 to separately store a job record via the first wireless communication section 222 and a job record via the second wireless communication section 224 and processing for determining a job achievement based on only the job record via the first wireless communication section 222. The processing section 210 may perform, for example, processing for causing the storing section 230 to store only the job record via the first wireless communication section 222. The processing section 210 may perform, for example, processing for causing the storing section 230 to store a job record including information indicating from which it is seen that the job record is via the first wireless communication section 222 or the second wireless communication section 224 and processing for calculating a job achievement by extracting only information via the first wireless communication section 222 from the job record.

Distinction between a wireless communication radio wave received by the first wireless communication section 222 and a wireless communication radio wave received by the second wireless communication section 224 can be realized by, for example, differentiating the semiconductor element of the first wireless communication section 222 and the semiconductor element of the second wireless communication section 224. However, the distinction may be realized by distinguishing the wireless communication radio waves on packet data or may be realized by distinguishing the wireless communication radio waves on a communication protocol.

In this way, the electronic apparatus 200 is capable of performing communication through the external access point AP by the first wireless communication section 222 and communication using the internal access point by the second wireless communication section 224. Therefore, it is possible to improve convenience of the electronic apparatus 200. When the job achievement information is information representing, of the job achievement through the external access point and the job achievement using the internal access point, the job achievement through the external access point, it is possible to accurately grasp the job achievement through the external access point. Accordingly, in a situation in which the user of the terminal device TM desires to connect to the electronic apparatus 200 using the external access point AP, the electronic apparatus 200 can appropriately search for, using the job achievement, the external access point AP to which the user desires to connect.

6. Other Configuration Examples

As another modification, the processing section 210 may perform, under a predetermined condition, processing for executing the second searching processing on only apart of the external access points AP found by the searching processing. The predetermined condition is that, for example, it is found by the searching processing (S1 or S101) that the wireless communication section 220 and an external access point AP4 are automatically connectable but, among the job records stored in the storing section 230, a ratio of job records through the external access point AP4 is extremely small compared with the other external access points AP.

The extremely small ratio includes zero as an absolute value. The storing section 230 may impart special priority to the external access point AP4 and store the special priority. The special priority is an indicator or the like for the processing section 210 to regard the external access point AP to which the special priority is imparted as not being the external access point AP having a connection achievement and not to set the external access point AP as a target of creation of a list of connection candidates.

As another modification, when the wireless communication section 220 is made connectable to the internal access point by the searching processing, the processing section 210 may perform processing for not creating a list of connection candidates based on the internal access point.

In this way, the storing section 230 may store connection achievement information representing a connection achievement between the wireless communication section 220 and the external access point AP. The processing section 210 may perform the second searching processing targeting, among external access points found by the searching processing, an external access point determined as having a connection achievement based on the connection achievement information. Consequently, it is possible to exclude, from targets of the second searching processing, the external access point AP that is less likely to be the external access point AP to which the user seems to desire to connect. Therefore the second searching processing can be quickly performed. Accordingly, the electronic apparatus 200 is highly likely to be able to automatically quickly connect the external access point AP to which the user desires to connect. It is possible to reduce a burden on the user in the wireless connection work.

As explained above, an electronic apparatus in this embodiment includes: a wireless communication section configured to perform wireless communication; a storing section configured to store identification information of a terminal device to which the wireless communication section has an achievement of connection through a network; and a processing section configured to perform communication control for the wireless communication section. The processing section performs searching processing for external access points. The processing section performs second searching processing for searching for the terminal device corresponding to the identification information stored in the storing section in a network formed by the external access points found by the searching processing. The processing section causes the wireless communication section to connect to the external access point to which the terminal device found by the second searching processing is connected.

Consequently, the processing section can determine, based on the identification information stored in the storing section, whether the terminal device having a connection achievement is present in the network formed by the external access points found by the searching processing. When the terminal device having a connection achievement belongs to a found external access point, the wireless communication section is connected to the external access point. Therefore, it is possible to realize connection processing to the external access point considering the connection achievement or the like of the terminal device.

The external access points may include a first external access point and a second external access point. When the first external access point and the second external access point are found by the searching processing, the processing section may connect the wireless communication section to the first external access point and determine whether the terminal device corresponding to the identification information is connected to the first external access point. Thereafter, the processing section may perform the second searching processing by connecting the wireless communication section to the second external access point and determining whether the terminal device corresponding to the identification information is connected to the second external access point.

Consequently, when a plurality of external access points are found by the searching processing, it is possible to determine whether the terminal device having a connection achievement belongs to the external access points and connect to the wireless communication section.

The storing section may store the identification information of the terminal device and job achievement information representing an achievement of a job concerning the terminal device in association with each other, and the processing section may cause the wireless communication section to connect to the external access point determined based on a result of the second searching processing and the job achievement information.

Consequently, it is possible to realize connection processing to the external access points considering a job achievement of the terminal device as well. It is possible to accurately grasp the external access point to which the terminal device that a user desires to connect belongs.

The job achievement information may be at least one of a number of times of job execution and job execution timing.

Consequently, since a scale for determining a job achievement is specified, it is possible to accurately compare job achievements of terminal devices. The electronic apparatus can appropriately search for, with the searching processing and the second searching processing, the external access point that should be connected.

The job may be a printing job, and the job achievement information may be at least one of a number of times of printing execution and printing timing.

Consequently, since a scale for determining a job achievement is specified, it is possible to accurately compare job achievements of the terminal devices. A printer can appropriately search for, with the searching processing and the second searching processing, the external access point that should be connected.

When a plurality of the terminal devices are found by the second searching processing, the processing section may cause the wireless communication section to connect to the external access point to which the terminal device determined based on the job achievement information among the found plurality of terminal devices is connected.

Consequently, even if a plurality of terminal devices including job achievements are found, it is possible to appropriately search for, by relatively comparing the job achievements, the external access point to which the terminal device that the user desires to connect belongs.

The external access points to which the terminal device found by the second searching processing is connected may be represented as first to N-th (N is an integer equal to or larger than 2) external access points. In this case, when L terminal devices (L is an integer equal to or larger than 1) are found in a network formed by an M-th (M is an integer equal to or larger than 1 and equal to or smaller than N) external access point, the processing section may calculate, based on L kinds of the job achievement information corresponding to the found L terminal devices, priority information representing connection priority of the M-th external access point and determine, based on the priority information, the external access point to which the processing section causes the wireless communication section to connect.

Consequently, it is possible to comprehensively determine job achievements of the terminal devices.

The wireless communication section may be capable of performing communication through the external access point and communication using an internal access point, and the job achievement information may be information representing, of a job achievement through the external access point and a job achievement using the internal access point, the job achievement through the external access point.

Consequently, it is possible to accurately grasp the job achievement through the external access point. Therefore, even the electronic apparatus including the internal access point can appropriately search for the external access point to which the terminal device that the user desires to connect belongs.

The storing section may store connection achievement information representing a connection achievement between the wireless communication section and the external access points. The processing section may perform the second searching processing targeting the external access point determined as having the connection achievement based on the connection achievement information among the external access points found by the searching processing.

Consequently, it is possible to exclude, from targets of the second searching processing, the external access point that is less likely to be the external access point to which the user seems to desire to connect. Therefore, it is possible to quickly perform the second searching processing.

A wireless communication method in this embodiment relates to a wireless communication method including: performing searching processing for external access points; performing second searching processing for searching for a terminal device having an achievement of connection in a network formed by the external access points found by the searching processing; and connecting to the external access point to which the terminal device found by the second searching processing is connected.

The embodiment is explained in detail above. Those skilled in the art will be able to easily understand that many modifications are possible without substantially departing from the new matters and the effects of the embodiment. Therefore, such modifications are assumed to be included in the scope of the present disclosure. For example, a term described together with a different term in a broader sense or a different synonymous term at least once in the specification or the drawings can be replaced with the different term in any part in the specification or the drawings. All combinations of the embodiment and the modifications are also included in the scope of the present disclosure. The configurations and the operations of the electronic apparatus, the terminal device, and the like are not limited to those explained in the embodiment. Various modified implementations of the configurations and the operations are possible.

What is claimed is:

1. An electronic apparatus comprising:
a wireless communication interface configured to perform wireless communication;
a memory configured to store identification information of a terminal device to which the wireless communication interface has an achievement of connection through a network; and
a processor configured to perform communication control for the wireless communication interface, wherein the processor
performs searching processing for external access points,
performs second searching processing for searching for the terminal device corresponding to the identification information stored in the memory, wherein the second searching processing is performed in a network formed by the external access points that are found by the searching processing, and
causes the wireless communication interface to connect to an external access point of the external access points, wherein the external access point corresponds to an access point to which the terminal device found by the second searching processing is connected.

2. The electronic apparatus according to claim 1, wherein the external access points include a first external access point and a second external access point, and
when the first external access point and the second external access point are found by the searching processing, the processor
connects the wireless communication interface to the first external access point,
determines whether the terminal device corresponding to the identification information is connected to the first external access point, and
performs the second searching processing by connecting the wireless communication interface to the second external access point and determining whether the terminal device corresponding to the identification information is connected to the second external access point.

3. The electronic apparatus according to claim 1, wherein the memory stores the identification information of the terminal device and job achievement information representing an achievement of a job concerning the terminal device in association with each other, and
the processor causes the wireless communication interface to connect to the external access point determined based on a result of the second searching processing and the job achievement information.

4. The electronic apparatus according to claim 3, wherein the job achievement information is at least one of a number of times of job execution and job execution timing.

5. The electronic apparatus according to claim 3, wherein the job is a printing job, and
the job achievement information is at least one of a number of times of printing execution and printing timing.

6. The electronic apparatus according to claim 3, wherein, when a plurality of terminal devices are found by the second searching processing, the processor causes the wireless communication interface to connect to the external access point to which the terminal device determined based on the job achievement information among the found plurality of terminal devices is connected.

7. The electronic apparatus according to claim 3, wherein when the external access points to which the terminal device found by the second searching processing is connected are represented as first to N-th (N is an integer equal to or larger than 2) external access points, and
when L number of terminal devices (L is an integer equal to or larger than 1) are found in a network formed by an M-th (M is an integer equal to or larger than 1 and equal to or smaller than N) external access point, the processor
calculates, based on L kinds of the job achievement information corresponding to the found L terminal devices, priority information representing connection priority of the M-th external access point, and determines, based on the priority information, the external access point to which the processor causes the wireless communication interface to connect.

8. The electronic apparatus according to claim 3, wherein the wireless communication interface is capable of performing communication through the external access point and communication using an internal access point, and the job achievement information is information representing, of a job achievement through the external access point and a job achievement using the internal access point, the job achievement through the external access point.

9. The electronic apparatus according to claim 1, wherein the memory stores connection achievement information representing a connection achievement between the wireless communication interface and the external access points, and the processor performs the second searching processing targeting the external access point determined as having the connection achievement based on the connection achievement information among the external access points found by the searching processing.

10. A wireless communication method by an electronic apparatus that performs wireless communication, the wireless communication method comprising:

performing searching processing for external access points;

performing second searching processing for searching for a terminal device having an achievement of connection, wherein the second searching is performed in a network formed by the external access points that are found by the searching processing; and connecting the electronic apparatus to an external access point of the external access points, wherein the external access point corresponds to an access point to which the terminal device found by the second searching processing is connected.

* * * * *